May 21, 1957   F. E. GEHRKE ET AL   2,793,277
TEXTILE PROCESSING APPARATUS

Filed March 30, 1956                    2 Sheets-Sheet 1

INVENTOR
FORREST E. GEHRKE
FRANK J. HUGHES
JOSEPH W. RITZ
By
ATTORNEY

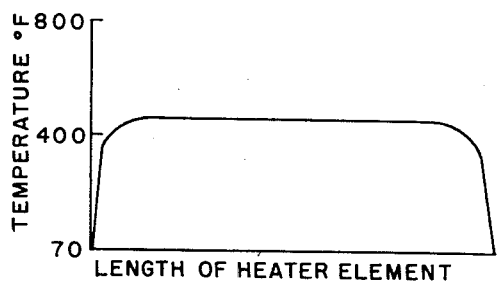
FIG.4
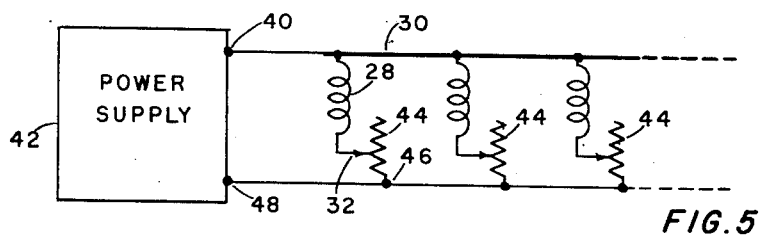
FIG.5
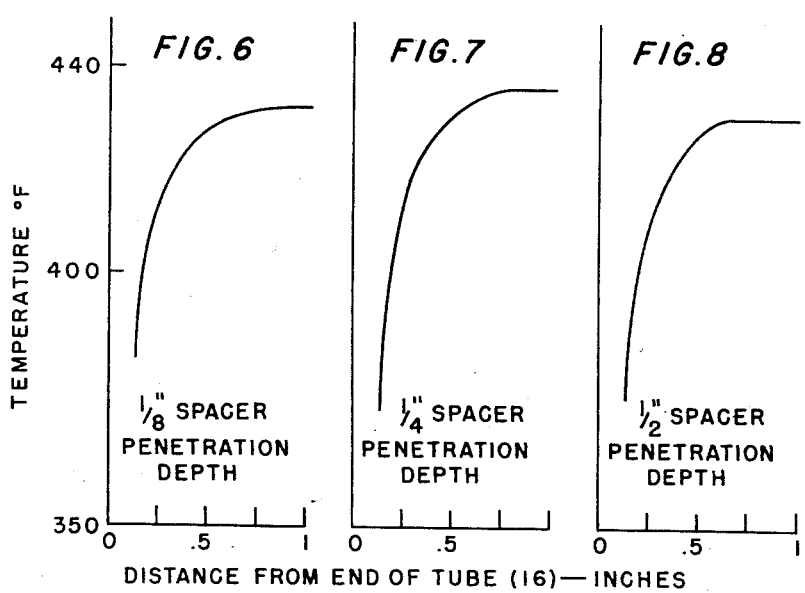
DISTANCE FROM END OF TUBE (16)—INCHES
*INVENTOR.*
FORREST E. GEHRKE
FRANK J. HUGHES
JOSEPH W. RITZ
*ATTORNEY*

United States Patent Office 2,793,277
Patented May 21, 1957

2,793,277

TEXTILE PROCESSING APPARATUS

Forrest E. Gehrke, Huntington Station, Frank J. Hughes, Levittown, and Joseph W. Ritz, Huntington, N. Y., assignors to Sylvania Electric Products Inc., a corporation of Massachusetts Application March 30, 1956, Serial No. 575,262

6 Claims. (Cl. 219—19)

Our invention relates to textile manufacturing apparatus and more particularly to electrical heater elements used in such manufacturing apparatus.

In the manufacture of stretch nylon yarn, a plurality of twisted strands of raw nylon are passed through a humidifier and then into an electrically heated furnace where the strands are heated to a temperature on the order of 400°–500° F. It is of the utmost importance to heat these strands uniformly at a constant temperature; if the operating temperature changes or if all heated surfaces of the furnace are not maintained at the same temperature, the yarn can burn or under certain circumstances can be improperly heated.

The art has knowledge of electrically heated furnaces which function in this manner. In such furnaces an electric heater element of conventional type is inserted into a large aluminum block and heats the entire block to the desired temperature. Small separate channels within the block are provided to receive the nylon strands.

This known furnace suffers from several extremely serious disadvantages. For example, electrical energy supplied to the block must not only be sufficient to heat the nylon strands, but must also heat the entire block. Consequently, the energy required is extremely high. Moreover, the aluminum block itself requires extensive and expensive machining operations.

We have invented a new type of heating device, which functions in the same manner as the known furnace, but which utilizes much less electrical energy and further is more adaptable to mass production techniques since the block machining operations are eliminated.

Accordingly it is an object of the present invention to provide a new and improved heater device of the character indicated.

Another object is to improve textile manufacturing apparatus through the use of a heater device of the character indicated.

Still another object is to provide a new and improved heater device utilizing a plurality of heater elements of the character indicated.

These and other objects of our invention will either be explained or will become apparent hereinafter.

In our invention there is provided first and second thermally conductive hollow tubes open at both ends. The second tube is mounted concentrically about the first tube in such manner that each end of the second tube is aligned with the corresponding end of the first tube. We further provide a pair of thermally conductive end spacers, each spacer being placed between a different end of the first tube and the corresponding end of the second tube to connect these tubes together. The space between the two tubes subtended by the two end spacers is filled with a thermally conductive material, for example air.

Each spacer is provided with an orifice which communicates with the interior of the first tube and is aligned with the axis thereof. An insulated wire which is electrically conductive is helically wound with variable pitch about the outer surface of the second tube. When electrical energy is supplied to this winding, it will be found that the interior of the second tube will be heated to a constant temperature, the actual temperature depending upon the voltage applied across the winding. The power required to operate this structure is minimal. For example, a typical known furnace of given heat capacity will consume about 43 watts, while a furnace of like capacity manufactured in accordance with our invention will require about 15 watts.

We further provide a thermally insulating block having a plurality of separate parallel heater element receiving channels. A heater element of the character described above is inserted within each channel and is secured thereto by a pair of thermally insulating end plugs, each of which is connected to a corresponding end spacer of the element. Each end plug is further provided with an orifice which is in registration with the orifice of the corresponding end spacer.

We further provide a like plurality of rheostats, each of which is provided with a fixed contact and a movable contact. The movable contact of each rheostat is connected to a selected end of the corresponding heater element winding.

In order to supply electrical energy to the various heater windings, the fixed contacts of all the rheostats are connected in common to a first point of operating potential, while the unselected ends of all the heater windings are connected in common to a second point of different operating potential. The provision of separate rheostats permits the temperature of each heater element to be adjusted individually.

We have found that the electrical interconnection of the unselected ends of the heater windings can be advantageously carried out by means of a bus bar encased within the insulating block in a position separate from the heater element receiving channels and electrically connected both to the second potential and to the unselected ends of these windings.

An illustrative embodiment of our invention will now be described in detail with reference to the accompanying drawings, wherein Figs. 1 and 2 are different views of the insulating block and the heater elements contained therein;

Fig. 4 is a graph illustrating the temperature characteristics of the heater element shown in Fig. 3;

Fig. 5 is an electrical schematic diagram of our invention; and

Figs. 6, 7 and 8 are graphs illustrating the relation between temperature distribution about the ends of the heater element and the position of the end spacers.

Figure 1:
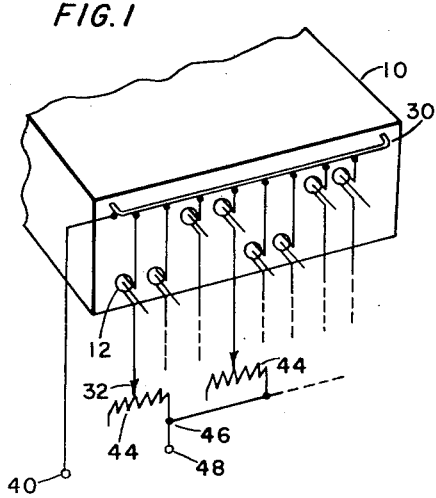
Figure 2:
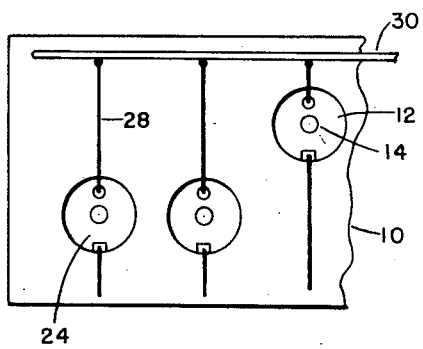
Figure 3:
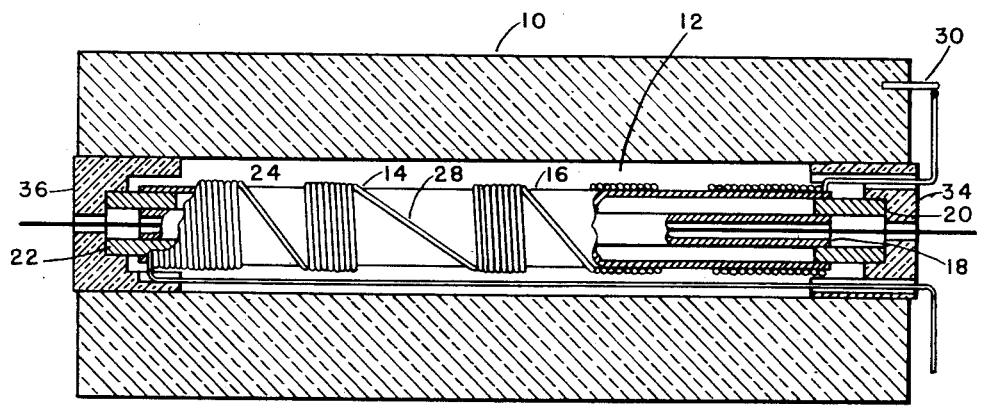
Fig. 3 is an enlarged view of a typical heater element.

Referring now to Figs. 1, 2 and 3 of the drawings, there is shown a thermally insulating block 10 formed, for example, of a material known to the art as foam glass.

The block contains a plurality of heater element receiving channels 12, each channel containing a heater element 14.

Each heater element is provided with a pair of hollow, thermally conductive tubes 16 and 18 formed, for example, of aluminum.

Tube 16 is concentrically mounted about tube 18 in such manner that the corresponding ends in these tubes are aligned. A pair of thermally conductive end spacers 20 and 22 serve to connect a different end of tube 16 to a corresponding end of tube 18. The space between the two tubes 24 subtended by the spacers is filled with a thermally conductive material, for example air. (A thermally conductive solid or liquid could also be used, if desired.)

An insulated conductor 28 having a high electrical resistance formed, for example, from aluminum oxide coated tungsten wire, is helically and circumferentially wound about the outer surface of tube 16. This winding has a variable pitch for reasons which will be described hereinafter.

One end of winding 28 is connected to a bus bar 30 embedded in block 10 in the manner shown. The bus bar in turn is connected to terminal 40 of a conventional power supply 42, as shown in Fig. 5.

The other end of each winding 28 is connected to a movable contact 32 of a corresponding one of a like plurality of rheostat 44. The fixed contact 46 of each rheostat is connected to terminal 48 of power supply 42. A pair of insulated end plugs 34, 36 are secured to corresponding end spacers of each heater element and are mounted at opposite ends of the heater element receiving channels 12. The temperature distribution within each of these heater elements is of the type shown in Fig. 4, although the actual temperature used will be determined by the setting of the associated rheostat.

As indicated in Fig. 3, the end spacers extend into the space between two tubes. As the depth of spacer penetration is changed, the temperature distribution about the ends of the tubes changes, and the operating temperature attained changes in value. For example, when the length of the tube 16 is about 7" and the diameter of the end spacers is about ¼", a spacer penetration depth of ⅛" will produce the temperature distribution shown in Fig. 6. A penetration depth of ¼" will produce the distribution shown in Fig. 7, while a penetration depth of ½" will produce the distribution shown in Fig. 8.

Ideally, the ends of the tubes must be maintained at the operating temperature. As indicated in Figs. 6–8, however, this temperature can only be obtained at a small but finite distance from the ends of the tubes. From this standpoint, the temperature distribution shown in Fig. 8 would appear to be most suitable as the operating temperature is reached at a point about ⅝" from the ends of the tubes as compared to Figs. 6 and 7, wherein the separation between the ends of the tubes and the point at which the operating temperature is reached exceeds ⅝". However, the operating temperature obtained in Fig. 8 is less than that obtained in Fig. 7.

Figs. 6–8 represent temperature measurements taken under conditions of identical power consumption; hence Fig. 8 represents operating conditions which are less efficient than the conditions represented by Fig. 7.

Thus, optimum temperature distribution and optimum operating efficiency conditions cannot both be obtained simultaneously through appropriate adjustment of spacer penetration depth and a compromise adjustment must be made, as illustrated in this example by Fig. 7.

We have found that the uniform temperature distribution illustrated in Fig. 4 depends upon the use of variable pitch windings; if the pitch is uniform, localized temperature variations will be produced. The pitch variation can be obtained either in the manner shown in Fig. 3, or by winding the wire in such manner that the separation between adjacent turns of wire is gradually increased or decreased.

The electric power required may be obtained from either an alternating current or a direct current source. A typical one of our heating elements when operated at a temperature of 411° F. consumed 13.6 watts; under these conditions, the voltage drop across the heater winding was about 104 volts and the current flowing through the winding was about 131 milliamperes. When the temperature was increased to 450° F., the voltage drop increased to 116 volts, and the current increased to 139 milliamperes. Thus, while the temperature changed appreciably, the voltage drop also changed appreciably, while the current flow remained essentially constant.

Consequently, the power supply 42 must be a voltage regulated power supply. Such devices are well known to the art and will not be described in further detail in this application. We have found that power supplies having a maximum voltage variation on the order of 1% are quite satisfactory for the purposes of this invention.

While we have shown and pointed out our invention as applied above, it will be apparent to those skilled in the art that many modifications can be made within the scope and sphere of our invention as defined in the claims which follow.

What is claimed is:

1. An electrical heater assembly comprising a thermally insulating body provided with a plurality of separated heater element receiving channels; a like plurality of heater elements, each element being positioned within the corresponding channel, each element including first and second thermally conductive hollow tubes open at both ends, the second tube being concentrically mounted about said first tube, corresponding ends of both tubes being aligned with each other, each pair of aligned ends being interconnected by a thermally conductive end spacer, each spacer having an orifice aligned with the axis of said first tube, each element further including an insulated wire having a high electrical resistance and wound circumferentially with variable pitch about the outer surface of said second tube, said wire having first and second electrical terminals; means electrically interconnecting the first terminals of all of said insulated wires; each heater element including a pair of thermally insulating end plugs, each plug being in contact with a corresponding end spacer and serving to secure said spacer to the walls of the heater channel containing said each element, each plug having an orifice aligned with the orifice of the corresponding spacer.

2. A heater element for maintaining the interior of a first thermally conductive hollow tube at a uniform temperature, said element comprising a second thermally conductive hollow tube concentrically mounted about said first tube, each end of said second tube being aligned with the corresponding end of the first tube; a pair of thermally conductive end spacers, each spacer being placed between and in contact with a different end of said second tube and the corresponding end of the first tube, each spacer being provided with an orifice communicating with the interior of said first tube and aligned with the axis thereof; and a helical insulated wire winding of high electrical resistance wound with variable pitch about the outer surface of said second tube, the space between said tubes subtended by said spacers being filled with a thermally conductive material.

3. A heater element as set forth in claim 2, wherein each end of said winding is connected to a corresponding electrical terminal, said element further including means to apply electrical energy between said terminals, said means including a rheostat for varying the voltage across said windings, there being a particular temperature associated with each fixed setting of the rheostat.

4. A heater element as set forth in claim 3, wherein said means includes a voltage regulated power supply.

5. A heater element for maintaining the interior of a first thermally conductive hollow tube at a uniform temperature, said element comprising a second thermally conductive hollow tube concentrically mounted about said first tube, each end of said second tube being aligned with the corresponding end of the first tube; a pair of thermally conductive end spacers, each spacer being placed between and in contact with a different end of said second tube and the corresponding end of the first tube, each spacer being provided with an orifice communicating with the interior of said first tube and aligned with the axis thereof; each spacer extending to a predetermined penetration depth into both of said tubes; and a helical insulated wire winding of high electrical resistance wound with variable pitch about the outer surface of said second tube, the space between said tubes subtended by said spacers being filled with a thermally conductive material, the temperature gradient adjacent said spacers in the interior of said first tube being determined by said penetration depth.

6. A heater element as set forth in claim 2, wherein each end of said winding is connected to a corresponding electrical terminal, said element further including means to apply electrical energy between said terminals, said means including a rheostat for varying the voltage across said winding, there being a particular temperature associated with each fixed setting of the rheostat and the penetration depth of said spacers, said particular temperature, for a given rheostat setting, being determined by said penetration depth.

References Cited in the file of this patent

UNITED STATES PATENTS

| | | |
|---|---|---|
| 1,897,187 | Jolas | Feb. 14, 1933 |
| 2,247,869 | Beers | July 1, 1941 |
| 2,387,479 | Todd | Oct. 23, 1945 |
| 2,520,532 | Dalgleish et al. | Aug. 29, 1950 |